UNITED STATES PATENT OFFICE.

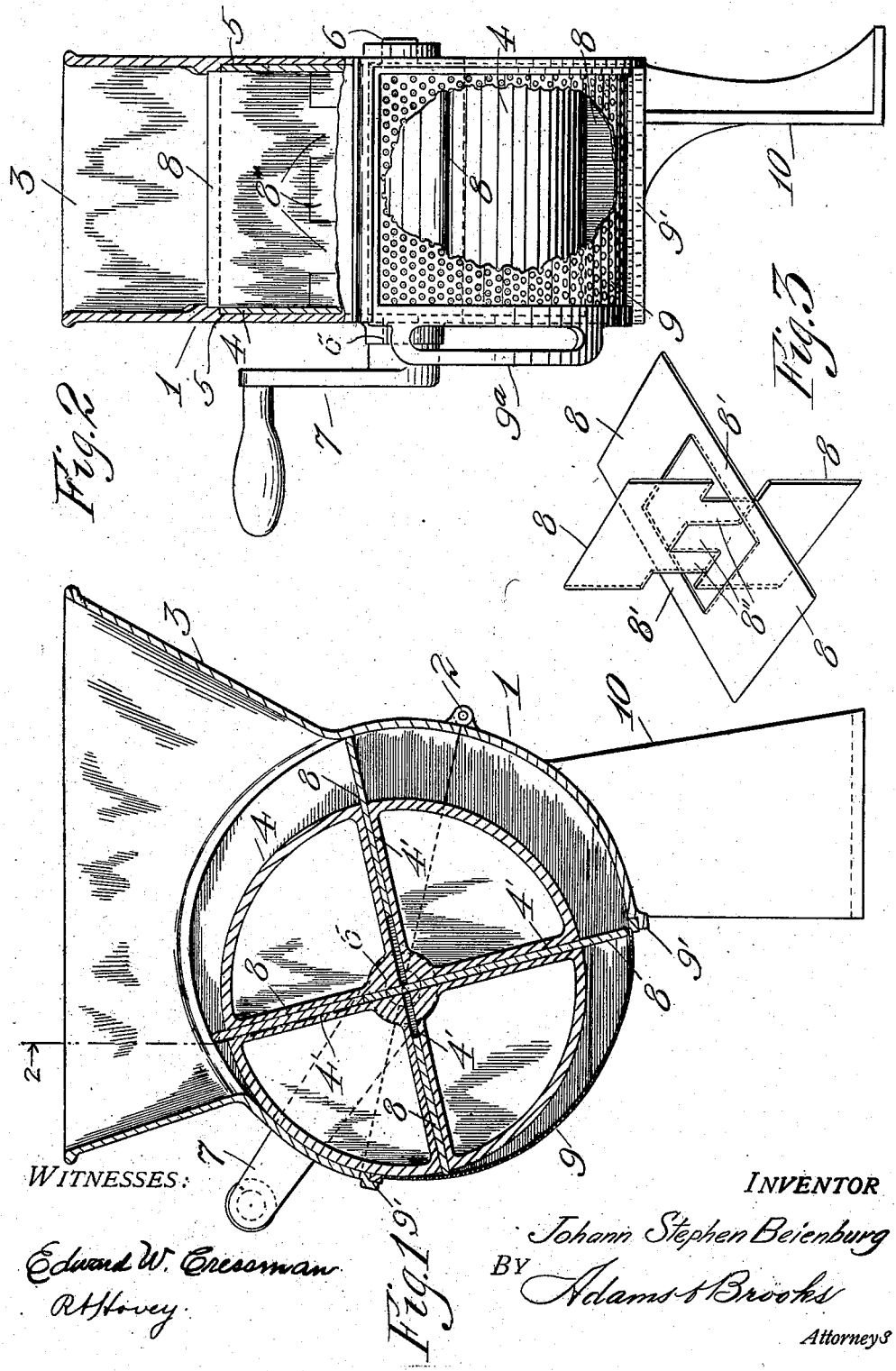

JOHANN STEPHAN BEIENBURG, OF SEATTLE, WASHINGTON.

FRUIT AND VEGETABLE MASHER.

No. 911,108.  Specification of Letters Patent.  Patented Feb. 2, 1909.

Application filed February 20, 1908. Serial No. 416,953.

*To all whom it may concern:*

Be it known that I, JOHANN STEPHAN BEIENBURG, a subject of the Emperor of Germany, and a resident of the city of Seattle, in the county of King and State of Washington, have invented certain new and useful Improvements in Fruit and Vegetable Mashers, of which the following is a specification.

My invention aims primarily to provide a comparatively simple device of the above type, by which vegetables and fruit or the like can be mashed in an expeditious manner.

With the above and other objects in view, to be referred to as the description progresses, the invention resides in the structural features, arrangement and combinations of parts hereinafter described and succinctly defined in the claim hereto annexed.

Referring now to the accompanying drawing, in which like numerals of reference indicate like parts throughout the several views: Figure 1 is a view in vertical section of a device, constructed in accordance with my invention. Fig. 2 is a view taken at right angles to the section shown in Fig. 1, being in partial section taken on line 2 of Fig. 1, and Fig. 3 is a detail perspective view of the conveyer blades removed from the rotary masher.

In carrying out my invention, I provide a suitable casing 1, formed of upper and lower sections hinged at 2 as clearly illustrated in Fig. 1, the upper of said sections being provided with a suitable hopper 3.

Mounted eccentrically in casing 1 is a rotary masher 4, of cylindrical form the same being supported for rotation in seats 5, formed in the side walls of casing 1 (see Fig. 2) and provided with outwardly projecting stub shafts 6 to one of which an operating handle 7 is conveniently secured.

Mounted in the rotary masher 4 for sliding into and out of the same are conveyer blades 8, said blades operating in pairs, one blade of each pair moving into the rotary masher while the other is being projected, as will be more readily understood hereinafter. Blades 8 have their outer end portions in constant engagement with the adjacent wall of casing 1 and said wall is so shaped as to cause the alternately inward and outward movements of said blades during movement of the rotary masher.

Reference numeral 9 indicates a strainer supported in the wall of casing 1, at the upwardly moving side of rotary masher 4, where the eccentricity of the peripheral portion of said masher is such that the space for the materials to be mashed, gradually decreases in width toward the upper end portion of the screen. As now considered, I prefer that the rotary masher engage said strainer at the upper portion thereof, as clearly illustrated in Fig. 1, whereby it will be impossible for any of the material being conveyed past the strainer, as will readily be understood.

By my improved construction the conveyer blades 8 will obviously prevent any backward movement of the materials while they are being acted upon by the rotary masher to force the same through the strainer.

Casing 1 may be provided with a suitable stand, as 10, which may be secured to a table or other suitable support in any desired manner.

Conveyer blades 8 are of novel construction, one pair being connected by rigid spaced arms 8′ while the other blades are independently removable, being provided with tongues 8″ fitted side by side and the outer being well spaced from the side edge portions of said blades so that one set of blades can slide freely by the other set. To arrange these blades in the rotary masher, the set connected by arms 8′ are first inserted in one of the guide ways 4′ of the masher, then the other blades are inserted into the other guide way 4′ of the masher from the opposite ends thereof as will be readily observed by reference to Figs. 1 and 3.

By supporting the rotary masher in seats formed in the walls of casing 1, I am enabled to provide a simple construction, wherein blades 8 will be of the required width to fit snugly in the casing.

Seats 5 are formed partly in both of the upper and lower sections of the casing 1, whereby upon swinging upwardly the upper casing section said masher can be removed, when desired.

Strainer 9 is provided with a handle 9ª, whereby it can be removed and others of a finer or coarser nature substituted to meet the different conditions of the material to be acted upon.

While I have herein shown and described a preferred embodiment of my invention, I reserve the right to make such changes in the structural details thereof as fall within the scope of the appended claim.

Having thus described my invention, what I claim as new, and desire to secure by Letters Patent of the United States of America, is:

A device of the character described comprising a casing provided in its walls with a strainer, a masher supported eccentrically in said casing for rotation, a pair of conveyer blades slidably supported in said masher for alternate projection and retraction, said blades being connected by rigid spaced arms, a second pair of conveyer blades slidably supported in said masher provided at their inner ends with extensions extending between the rigid connecting arms of said first named pair of blades, the said extensions fitting beside one another and being unsecured, all of said blades having their outer end portions continually in engagement with the adjacent wall of the casing, said wall of the casing being shaped to cause said blades to move alternately into and out of said masher, and a crank fixed to said masher for rotating the same.

Signed at Seattle Washington this 3d day of Jany. 1908.

JOHANN STEPHAN BEIENBURG.

Witnesses:
 STEPHEN A. BROOKS,
 EDWARD W. CRESSMAN.